United States Patent [19]

Watt

[11] Patent Number: 5,065,475

[45] Date of Patent: Nov. 19, 1991

[54] HANDLE ATTACHMENT FOR AN IMPLEMENT HAVING AN ELONGATE HANDLE SHAFT

[76] Inventor: Allan Watt, 11 Morton Bay, Winnipeg, Manitoba, Canada, R3R 2C5

[21] Appl. No.: 564,574

[22] Filed: Aug. 9, 1990

[51] Int. Cl.⁵ .......................... A01B 1/22; B25G 3/00
[52] U.S. Cl. ................... 16/114 R; 15/145; 294/58
[58] Field of Search ............ 294/50, 50.9, 57, 58, 294/59; 15/143 R, 144 R, 145; 16/110 R, 111 R, 114 R, 115, DIG. 12, DIG. 25; 172/371; 56/400.04

[56] References Cited

U.S. PATENT DOCUMENTS

| | | | |
|---|---|---|---|
| 120,607 | 11/1871 | Alsip | 294/58 |
| 304,067 | 8/1884 | Boyles | 294/58 |
| 758,482 | 4/1904 | Smith | 294/58 X |
| 826,928 | 7/1906 | Fleck | 294/58 |
| 1,027,345 | 5/1912 | Lapin | 294/58 X |
| 2,337,643 | 12/1943 | Buser | 294/58 |
| 2,482,589 | 9/1949 | Maguire | 294/58 |
| 2,653,406 | 9/1953 | Grabiak et al. | 294/58 X |
| 4,701,142 | 10/1987 | Merritt | 294/58 X |
| 4,958,407 | 9/1990 | Johnson | 294/58 X |

FOREIGN PATENT DOCUMENTS

| | | | |
|---|---|---|---|
| 1306074 | 9/1962 | France | 294/58 |
| 322531 | 12/1929 | United Kingdom | 294/58 |

Primary Examiner—Johnny D. Cherry
Attorney, Agent, or Firm—Adrian D. Battison; Stanley G. Ade; Murray E. Thrift

[57] ABSTRACT

An implement such as a broom or rake has a supplementary handle attachment mounted upon an upper side of the conventional shank of the implement. The handle attachment includes a first hand grip section in the form of a bar parallel to the shank and spaced upwardly from the shank. A pair of further hand grip portions are attached to the bar at respective ends of the bar and extend therefrom upwardly and forwardly toward the implement head. The further hand grip portions consist simply of a simple cylindrical body shaped solely to receive the hand of the user gripped therearound without any further handle sections at the upper end. The handle attachment allows a user to select the preferred hand grip locations to allow operation of the device without bending.

3 Claims, 1 Drawing Sheet

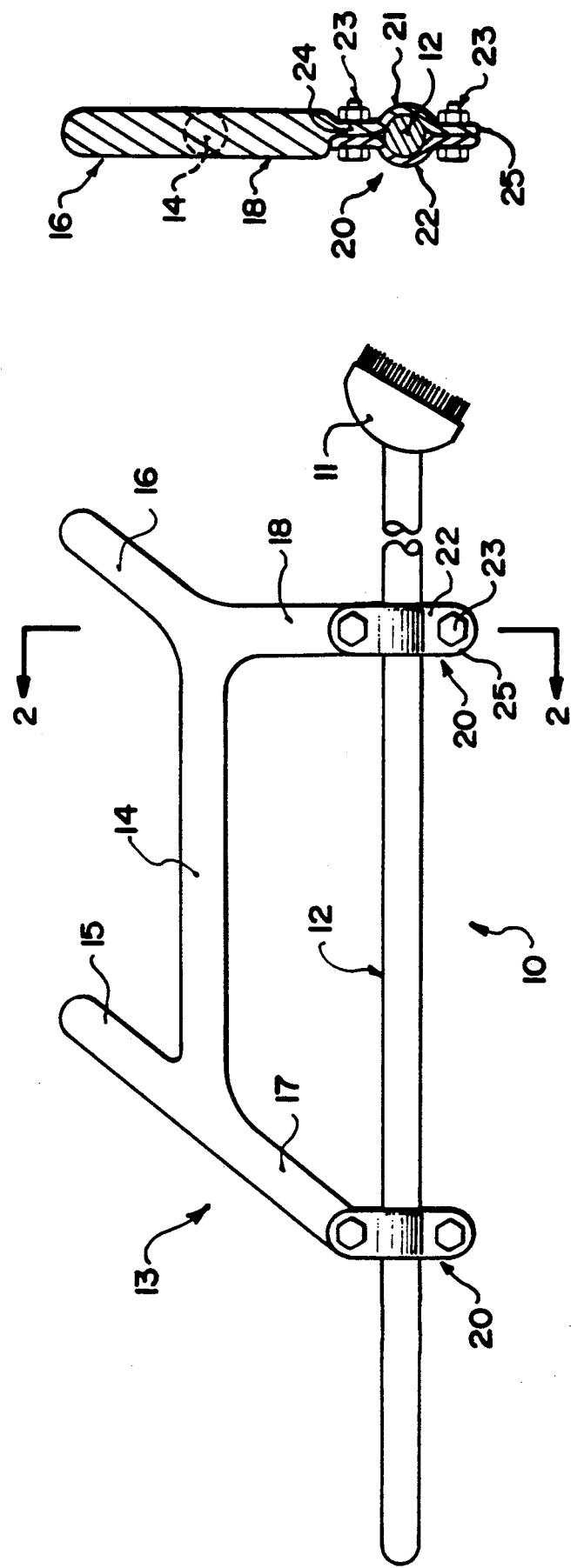

HANDLE ATTACHMENT FOR AN IMPLEMENT HAVING AN ELONGATE HANDLE SHAFT

BACKGROUND OF THE INVENTION

This invention relates to a handle attachment for an implement such as a push broom, rake or the like which has an elongate handle shaft and an implement head at a lower end of the shaft.

The mounting of the handle attachment on elongate handles of this type is previously known and examples are shown in U.S. Pat. Nos. 120,607 (Alsip), 304,067 (Boyles), 758,482 (Smith), 1,027,345 (Lapin), and 4,701,142 (Merritt).

The objective of these handle arrangements is in most cases to reduce the bending necessary by the user so that the handle attachment is mounted downwardly from the upper end of the handle and provides a hand grip portion raised relative to the main shaft of the implement to allow the user to grasp the handle without the necessity for the conventional amount of bending.

Thus Alsip provides a handle attachment on a shovel which extends upwardly from the main handle and then inclines to a position where it is substantially parallel to the main handle and extends towards the shovel blade. This provides simply a single hand grip position which is raised approximately six inches from the normal location and still requires significant bending.

Boyles and Lapin provide an arrangement including a transverse T-bar type handle which again allows the hand of the user to be raised approximately six inches from its normal location at the lower part of the handle shaft. This again is very limited in its operation and does not significantly improve the bending necessary. Smith provides a handle alongside a crow bar or post hole digger with the handle simply forming a parallel bar to the main shaft of the implement but this is of a different type in that the implement is not intended to be one where the shaft is inclined to the ground. But in this case the handle merely improves the possibility of gripping the main shaft of the device.

Merritt provides an additional inclined handle on a canoe paddle. However, this again is of limited value in reducing the necessity for bending.

SUMMARY OF THE INVENTION

It is one object of the present invention, therefore, to provide a handle attachment on an implement of this type which allows the user to stand more erect, relieving stress on back muscles or the like particularly when using a rake, push broom or other ground working implement with an elongate handle shaft.

According to the invention, therefore, there is provided a hand operated implement comprising an elongate handle shaft, an implement head on the remote end of the handle shaft and a hand grasping section mounted on the shaft so as to project outwardly to one side of the shaft, a hand grasping section comprising a first hand grip portion defined by an elongate bar substantially parallel to the handle shaft and extending along part of the length of the shaft, coupling means mounting the first hand grip portion on the handle shaft, a second hand grip portion mounted on the first hand grip portion adjacent one end thereof and extending outwardly therefrom in a direction away from the handle shaft and a third hand grip portion mounted on the first hand grip portion adjacent an opposed end thereof and extending outwardly therefrom in a direction away from the handle shaft, the hand grasping section lying substantially in an axial plane of the handle shaft arranged to stand upwardly from the handle shaft when the implement head is in operating position on the ground.

The device can therefore have the following advantages:

firstly, the device can be easily custom attached and removed by the user to suit individual height and reference for use and position on the shaft;

secondly, the device can be manufactured in a sturdy and lightweight construction from metal, plastic or the like which will not add greatly to the weight of the total assembly;

thirdly, the configuration of the device including the first and second and third hand grip portions with the first hand grip portion extending longitudinally of the shaft and the second and third hand grip portions extending outwardly from the first hand grip portion at respective ends thereof provides the user with a variation of holding positions depending upon the task in hand, the implement head on the lower end of the tool and the preference of the user for holding. The second and third projecting hand grip portions can be used in an arrangement in which only one is gripped by the hand of the user while the other hand of the user rests upon the handle shaft or alternatively both hand grip portions can be grasped by the user so that all of the force applied to the implement is applied through the attachment rather than the shaft itself.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevational view of an implement including a handle attachment according to the present invention.

FIG. 2 is a cross sectional view along the lines 2—2 of FIG. 1.

In the drawings like characters of reference indicate corresponding parts in the different figures.

DETAILED DESCRIPTION

A conventional implement, for example, a broom or rake, is generally indicated at 10 and includes an implement head 11 and a main handle shaft 12 connected to the head 11 and operable to move the implement head across the ground, in a sweeping, raking, hoeing, digging or other action.

The present invention provides a handle attachment generally indicated at 13 for attachment to the implement handle. The handle attachment comprises a first hand grip portion 14, a second hand grip portion 15 and a third hand grip portion 16. The handle attachment further includes a first coupling arm 17 and a second coupling arm 18 for connection to the handle 12. Generally, the attachment lies in a single plane which as shown in FIG. 2 when attached comprises an axial plane of the handle 12. The attachment is molded from plastics material or can be formed from tubular metal as required.

Each of the connecting arms 17 and 18 includes a clamping element generally indicated at 20 at the lowermost end thereof for clamping engagement around the shaft 12. The clamping element comprises a bracket 21 and a cooperating plate 22 which can be pulled together by nut and bolt connections 23 to clamp around the shaft 12. The bracket and the plate are bent to surround the cylindrical shape of the handle 12 as best shown in FIG. 2. The bracket 21 is formed integrally with the lower part of the connecting arm 18 thus forming a neck section 24 through which the upper bolt 23 passes followed by a strap portion which wraps around the handle 12 and terminating in a flange portion 25 at the lower end for receiving the second bolt 23.

From the clamping element 20, the respective arm 17 and 18 extends outwardly from the handle 12. The connecting arm 18 extends generally at right angles to the shaft 12. The connecting arm 17 is inclined out of the right angle direction in a direction downwardly toward the implement head 11 that is toward the lower end of the attachment and the arm 18.

The connecting arms 17 and 18 are coupled integrally to the first hand grip portion 14 at the ends thereof. The second and third hand grip portions respectively constitute extensions of the connecting arm. In particular, the second hand grip portion 15 extends as a direct linear extension of the coupling arm 17 and thus lies at an angle to the first hand grip portion 14. The third hand grip portion 16 is inclined relative to the coupling arm 18 and lies parallel to the second hand grip portion.

Each of the hand grip portions consists solely of a substantially circular cylindrical cross section which may be deformed from the circular cross section to an oval or slightly flattened shape to more effectively receive the hand of the user. The hand grip portions may be roughened by molded projections. The lower end of the body is attached to the first hand grip portion 14. The upper end is simply an end of the body so that the hand of the user can only be gripped around the body.

In operation, the user can place one hand at the top of the handle shaft 12 and the second hand which is often the left hand in a normal right handed user on one of the hand grip portions depending upon the amount of pressure that the user requires to apply, the amount of bending that the user wishes to undertake, the angle of the shaft 12 and the selected position of the attachment along the length of the handle 12. The downward inclination of the second and third hand grip portions allows the implement to be lifted simply by pulling against the underside of the hand grip portion.

In an alternative mode of use, the user can place one hand on one of the hand grip portions of the handle attachment and the other handle on another of the hand grip portion, thus operating the device wholly by the attachment.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A hand operated implement comprising an elongate handle shaft, an implement head on the remote end of the handle shaft and a hand grasping section mounted on the shaft so as to project outwardly to one side of the shaft, the hand grasping section comprising a first hand grip portion defined by an elongate bar substantially parallel to the handle shaft and extending along part of the length of the shaft, coupling means mounting the first hand grip portion on the handle shaft, a second hand grip portion mounted on the first hand grip portion adjacent one end thereof and extending outwardly therefrom in a direction extending away from the handle shaft and inclined relative to the first hand grip portion at an acute angle relative to a line extending along the first hand grip portion toward the implement head, and a third hand grip portion mounted on the first hand grip portion adjacent an opposed end thereof and extending outwardly therefrom in a direction away from the handle shaft and substantially parallel to the second hand grip portion, the hand grasping section lying substantially in an axial plane of the handle shaft arranged to stand upwardly from the handle shaft when the implement head is in operating position on the ground, each of said second and third hand grip portions consisting solely of a substantially cylindrical body having one end connected to said first hand grip portion and an opposed end at which said each hand grip portion terminates such that said each hand grip portion can receive a hand of the user only gripped around the body.

2. The implement according to claim 1 wherein the coupling means comprise a first and second connecting arm, each arranged at a respective end of the first hand grip portion and each extending therefrom to the handle shaft.

3. The implement according to claim 1 wherein the coupling means includes clamping means for releasably clamping the hand grasping section to the handle shaft.

* * * * *